(12) United States Patent
Beshears et al.

(10) Patent No.: US 8,483,383 B2
(45) Date of Patent: Jul. 9, 2013

(54) METHOD OF SCHEDULING CALLS

(75) Inventors: Aaron C. Beshears, Franklin, TN (US);
Donald C. Lewis, Bell Buckle, TN (US)

(73) Assignee: Aspect Software, Inc., Chelmsford, MA (US)

( * ) Notice: Subject to any disclaimer, the term of this patent is extended or adjusted under 35 U.S.C. 154(b) by 1515 days.

(21) Appl. No.: 11/681,241

(22) Filed: Mar. 2, 2007

(65) Prior Publication Data

US 2008/0212760 A1 Sep. 4, 2008

(51) Int. Cl.
*H04M 3/00* (2006.01)
*H04M 7/00* (2006.01)

(52) U.S. Cl.
USPC .................................. 379/266.08; 379/221.07

(58) Field of Classification Search
USPC .................. 379/34, 265.01, 266.08, 216, 265, 379/266, 128, 133, 309, 221.05, 221.06
See application file for complete search history.

(56) References Cited

U.S. PATENT DOCUMENTS

| | | | |
|---|---|---|---|
| 5,327,490 A * | 7/1994 | Cave | 379/266.01 |
| 5,570,419 A * | 10/1996 | Cave et al. | 379/266.08 |
| 5,621,790 A | 4/1997 | Grossman et al. | |
| 5,822,400 A * | 10/1998 | Smith | 379/32.02 |
| 5,889,799 A * | 3/1999 | Grossman et al. | 379/266.08 |
| 5,911,134 A | 6/1999 | Castonguay et al. | |
| 6,449,358 B1 * | 9/2002 | Anisimov et al. | 379/266.07 |
| 7,003,079 B1 * | 2/2006 | McCarthy et al. | 379/32.01 |
| 7,103,173 B2 * | 9/2006 | Rodenbusch et al. | 379/266.07 |
| 2003/0018762 A1 * | 1/2003 | Mullen | 709/223 |
| 2003/0033184 A1 | 2/2003 | Benbassat et al. | |
| 2004/0010437 A1 | 1/2004 | Kiran et al. | |
| 2004/0267591 A1 | 12/2004 | Hedlund et al. | |
| 2005/0002515 A1 * | 1/2005 | Mewhinney et al. | 379/266.08 |
| 2006/0167729 A1 * | 7/2006 | Rafter et al. | 705/8 |

OTHER PUBLICATIONS

EP Search Report for related patent application dated May 27, 2010.

* cited by examiner

*Primary Examiner* — Mohammad Islam
*Assistant Examiner* — Kharye Pope
(74) *Attorney, Agent, or Firm* — Husch Blackwell LLP

(57) ABSTRACT

An apparatus and method are provided for scheduling calls. The method includes the steps of providing a calling period with a plurality of sub-periods and determining a set of historical call completion ratios associated with the plurality of sub-periods. The method further includes the steps of exponentially scaling the respective determined call completion ratios and placing a number of calls during each sub-period of the calling period where the number of calls placed during each sub-period is based upon the respective exponentially scaled call completion ratio.

20 Claims, 1 Drawing Sheet

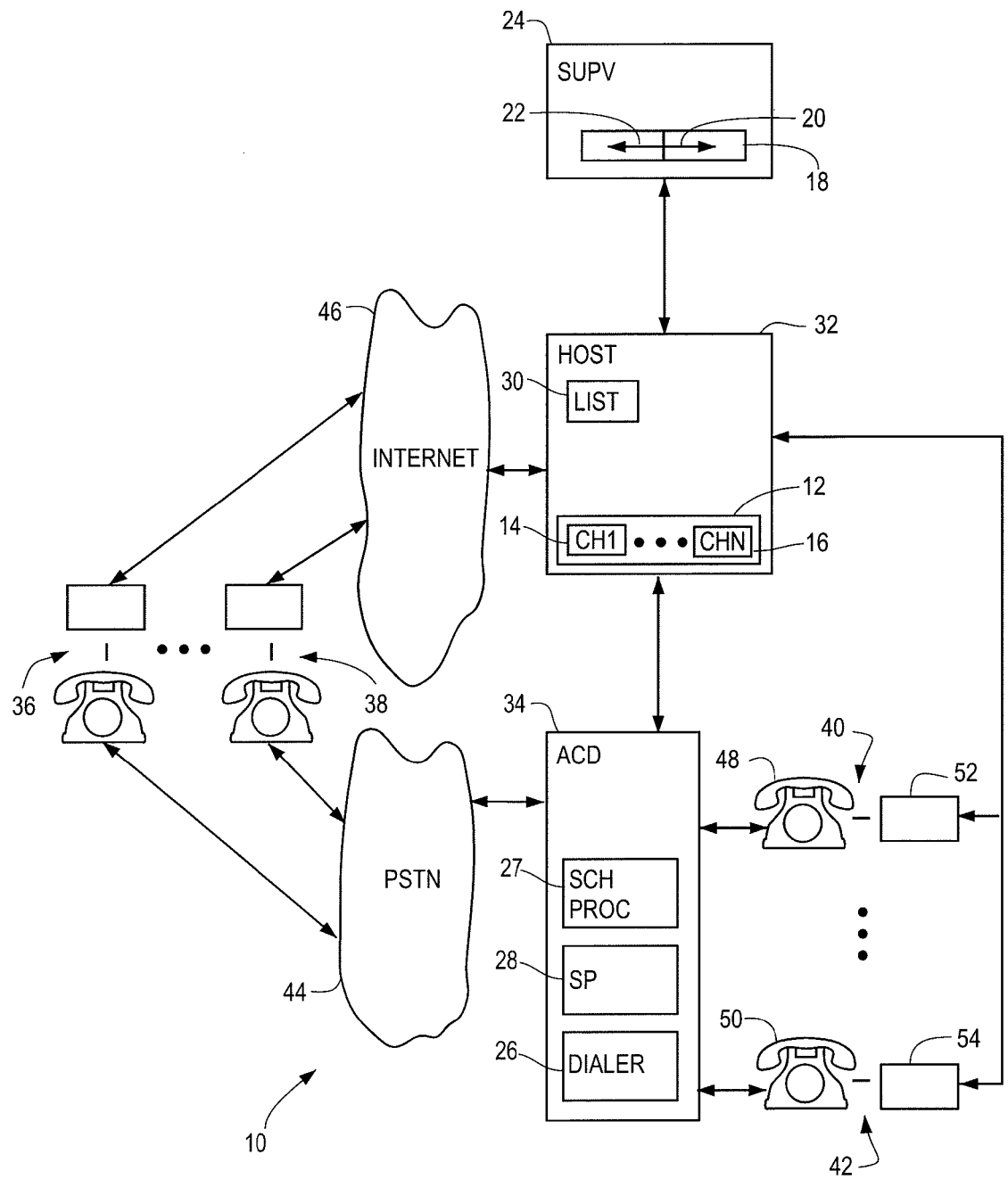

METHOD OF SCHEDULING CALLS

FIELD OF THE INVENTION

The field of the invention relates to call distribution systems and more particularly to methods of scheduling calls.

BACKGROUND OF THE INVENTION

Call centers are generally used by organizations to handle large numbers of calls with clients. An automatic call distributor (ACD) of the call center processes the calls with clients of the organization and distributes the calls to agents of the organization. An ACD usually handles inbound calls although a dialer may be associated with the ACD to allow the ACD to handle both inbound and outbound calls.

In a commercial context, a call center may be used by a merchant to receive calls from clients who wish to place orders, check on orders or register complaints. Alternatively and in the same context, a call center may be used by an organization to place outbound calls. In this context, a credit card company may generate a list of delinquent accounts with respective telephone numbers and cause the ACD to place calls to those numbers. As each number is dialed, the ACD may monitor the connection for pick-up by a person. When the ACD detects that a person has answered the call, the ACD may select an agent and connect the call to the selected agent.

In other, blended systems, inbound and outbound calls may be handled simultaneously. In this case, an appropriate number of agents may be assigned to handling inbound calls. Any remaining agents may be assigned to handling outbound calls. As call loading changes during any particular time period, the percentages of agents assigned to inbound and outbound calls may be adjusted. For example, the time that a client remains in a call waiting queue may be monitored. If the time exceeds a predetermined threshold, then the number of agents assigned to inbound and outbound calls may be adjusted. If the time in queue is too long then agents may be transferred from making outbound calls to receiving inbound calls. If the time in queue becomes relatively short then agents may be transferred from receiving inbound calls to making outbound calls.

While blended systems work relatively well, they also lack the flexibility to efficiently utilize agent time. Accordingly, a need exists for better methods of scheduling agent activity.

SUMMARY

An apparatus and method are provided for scheduling calls. The method includes the steps of providing a calling period with a plurality of sub-periods and determining a set of historical call completion ratios associated with the plurality of sub-periods. The method further includes the steps of exponentially scaling the respective determined call completion ratios and placing a number of calls during each sub-period of the calling period where the number of calls placed during each sub-period is based upon the respective exponentially scaled call completion ratio.

BRIEF DESCRIPTION OF THE DRAWINGS

FIG. 1 depicts a system for scheduling outbound calls in accordance with an illustrated embodiment of the invention.

DETAIL DESCRIPTION OF AN ILLUSTRATED EMBODIMENT

FIG. 1 depicts a system 10 for scheduling calls between clients and agents of an organization as shown generally in accordance with an illustrated embodiment of the invention. Under a first illustrated embodiment, outbound calls are scheduled based upon the likelihood of completion of the call. Under a second illustrated embodiment, outbound calls are scheduled based upon an exponential scaling the likelihood of completion of the call. Under a third illustrated embodiment, outbound calls are scheduled based upon exponential scaling the likelihood of completion with the correct (right) party. The scheduling of outbound calls based upon the likelihood of completion allows for a significant improvement in the ability of an organization to schedule and more efficiently use its agents.

As used herein, a call involves a substantially real time exchange of information between a client and an agent of the organization. The call may be a switched circuit call placed through the PSTN 44 or a call placed through the Internet 46. For convenience, the description will focus primarily on a switched circuit call, but it should be understood that the concepts described herein also apply to Internet calls.

Past practice in the art of call centers has been based upon the theory that inbound calls should be preferentially handled and that any extra agents should be assigned to making outbound calls. However, this approach has been found to be inefficient due to the variable nature of call completion and is more reactive than proactive. For example, it has been found that call placed early in the morning have a higher completion ratio than calls placed after the start of the workday for most people. In addition, calls placed near mid-day have a higher completion ratio than calls placed early or later than mid-day.

The rate at which a call reaches the right party may also vary according to the time of day. While the right party completion ratio may track the overall completion ratio, the right party completion ratio can also depend upon the social situation of the call target. For example, a stay-at-home father or stay-at-home mother responsible for child care would have a higher call completion ratio in mid-morning after the children have gone to school than at mid-day when the care giver would more likely be running errands.

In order to increase the likelihood of call completion, the system 10 may collect statistics regarding call completion ratios for each of a number of different types of groups of call targets. The collected statistics may be collected based upon demographics as well as upon prior calls to a particular group of call targets. For example, if the call targets are a group of existing customers of the organization, then the organization may collect statistics about call completion ratios over a calling period (e.g., an 8-hour work shift, a 10 hour work shift, a 12 hour day, etc.). Under one illustrated embodiment, the system 10 divides the calling period into 10 sub-periods and determines a call completion ratio for each sub-period.

As the statistics of each group are collect, the statistics 14, 16 of each group type are stored in a database 12. Table A depicts the statistics of a particular group type.

TABLE A

| PERIOD | NUMBER OF ATTEMPTS | NUMBER OF COMPLETIONS | COMPLETION PERCENT (CP) |
|---|---|---|---|
| 1 | 192 | 28 | 14.5833333% |
| 2 | 109 | 2 | 1.8348624% |
| 3 | 266 | 48 | 18.0451128% |
| 4 | 98 | 24 | 24.4897959% |
| 5 | 202 | 33 | 16.3366337% |
| 6 | 89 | 10 | 11.2359551% |
| 7 | 125 | 2 | 1.6000000% |

TABLE A-continued

| PERIOD | NUMBER OF ATTEMPTS | NUMBER OF COMPLETIONS | COMPLETION PERCENT (CP) |
|---|---|---|---|
| 8 | 277 | 20 | 7.2202166% |
| 9 | 89 | 14 | 15.7303371% |
| 10 | 114 | 4 | 3.5087719% |
| | 1561 | 185 | |

As may be noted from Table A, the best time to place calls in order to make a connection to this group type is during periods 1, 3, 4, 5 and 9 because of the relatively high completion ratio. However, it would be beneficial to place more calls during period 4 than during period 3 or period 5. In order to place the appropriate combination of calls to maximize the effect of the higher relative completion ratios, the system 10 exponentially scales the highest call completion ratios of Table A. The exponentially scaled ratios may then be used with a list of calls to be made and the number of passes to be made through the list to arrive at the number of calls to be made during each sub-period of the calling period.

In general, the exponentially scaled ratios form a distribution of a sequence of non-negative values $\{a_1, a_2, \ldots a_n\}$ such that $$\sum_{i=1}^{n} a_i = 1.$$

In general, any sequence of non-negative numbers $\{b_1, b_2, \ldots b_n\}$ at least one of which is not zero can be converted into a distribution $\{a_1, a_2, \ldots a_n\}$ by normalizing the values in the sequence. This may be performed via the equation $$a_j = \frac{(b_j)}{\sum_{i=1}^{n} b_i}.$$

Suppose that $\{x_1, x_2, \ldots x_n\}$ is a sequence of numbers (i.e., completion percentages (CPs)) and $\mu$ is a real number. The sequence of numbers can be converted into a distribution via the equation $$a_j = \frac{(x_j)^{\mu}}{\sum_{i=1}^{n} (x_i)^{\mu}}.$$

The magnitude of exponential scaling is determined by adjusting a value of $\mu$. The value of the exponential scaling may be controlled through use of a scaling softkey 18 located on an analyst station 24. The analyst may increase 20 the exponential scaling or decrease 22 the exponential scaling in real time and as appropriate to the needs of the organization. Under one illustrated embodiment of the invention, the value of $\mu$ may be adjusted to any value between −20 and +20.

By way of example, the value of $\mu$ may be set to 2, the list size may be 2000 and the number of passes is 3. The process of exponentially scaling the sub-periods with the highest relative completion ratios is shown in Table B. As shown, the sub-period number is shown in the left column and the completion percentage is shown in the second column from the left. As a first step, the completion percentage of the second column is scaled by the exponent $\mu$ (i.e., $CP^{\mu}$). As a second step the scaled completion values are summed to provide a scaled total (i.e., 0.184900 from the bottom of the third column). The values of the third column are then divided by the scaled total to provide a normalized, exponentially scaled value for each of the sub-periods (shown in the fourth column from the left).

TABLE B

| PERIOD | COMPLETION PERCENT (CP) | $CP^{\mu}$ | $CP^{\mu}/0.184900$ |
|---|---|---|---|
| 1 | 14.583333% | 0.021267 | 0.115021 |
| 2 | 1.834862% | 0.000337 | 0.001821 |
| 3 | 18.045113% | 0.032563 | 0.176110 |
| 4 | 24.489796% | 0.059975 | 0.324365 |
| 5 | 16.336634% | 0.026689 | 0.144341 |
| 6 | 11.235955% | 0.012625 | 0.068279 |
| 7 | 1.600000% | 0.000256 | 0.001385 |
| 8 | 7.220217% | 0.005213 | 0.028195 |
| 9 | 15.730337% | 0.024744 | 0.133826 |
| 10 | 3.508772% | 0.001231 | 0.006658 |
| | | 0.184900 | 1.000000 |

As shown in Table B, if the values in column four are used to distribute the attempts throughout the day, the scaling by the exponential value $\mu$ has a relatively large effect upon the attempts in the respective sub-periods. For example, as shown in Table B, scaling by the exponential value $\mu$ causes 32.4365% of the calls to be placed in sub-period number 4. This has the disproportionate effect of placing the greatest number of outbound calls during the period when they are most likely to be completed.

Table C shows the effects of the above sample. For pass number 1 the initial value of the list is 2000 calls. The number of calls attempted (ATT.) in the sub-period 1 is 230 calls (2000×0.115021). Since the completion percent (CP) in the first sub-period is 14.583333% only 34 calls would be completed in the first sub-period.

It should be noted that at the end of the first pass, 365 calls have been completed. As such, the number of calls that would be attempted in the second pass would be 1635 (2000−365).

TABLE C

| PERIOD | PASS 1 ATT. | PASS 1 COM. | PASS 2 ATT. | PASS 2 COM. | PASS 3 ATT. | PASS 3 COM. | TOTAL ATT. | TOTAL COM. |
|---|---|---|---|---|---|---|---|---|
| LIST | 2000 | | 1635 | | 1336 | | | |
| 1 | 230 | 34 | 188 | 27 | 154 | 22 | 572 | 83 |
| 2 | 4 | 0 | 3 | 0 | 2 | 0 | 9 | 0 |
| 3 | 352 | 64 | 288 | 52 | 235 | 42 | 875 | 158 |
| 4 | 649 | 159 | 530 | 130 | 433 | 106 | 1612 | 395 |
| 5 | 289 | 47 | 236 | 39 | 193 | 32 | 718 | 117 |
| 6 | 137 | 15 | 112 | 13 | 91 | 10 | 339 | 38 |
| 7 | 3 | 0 | 2 | 0 | 2 | 0 | 7 | 0 |
| 8 | 56 | 4 | 46 | 3 | 38 | 3 | 140 | 10 |
| 9 | 268 | 42 | 219 | 34 | 179 | 28 | 665 | 105 |
| 10 | 13 | 0 | 11 | 0 | 9 | 0 | 33 | 1 |
| | 2000 | 365 | 1635 | 299 | 1336 | 244 | 4971 | 908 |

As a further example, it may be assumed that the right party completion rate for sub-period 1 is 57.142857%, for sub-period 2 is 50.000000%, for sub-period 3 is 68.750000%, for sub-period 4 is 75.000000%, for sub-period 5 is 48.484848%, for sub-period 6 is 50.000000%, for sub-period 7 is 100.000000%, for sub-period 8 is 70.000000%, for sub-period 9 is 7.142857% and for sub-period 10 is 50.000000%.

The right party completion rate for each sub-period is multiplied by the respective CP value of each sub-period to provide a new overall completion rate for each sub-period in the second column of Table B, a new scaled value for each sub-period in the third column and a new normalized scaled value for each sub-period in the fourth column. Using a value of $\mu$ of 2, a list of 2000 and 3 passes, the outgoing calls may be adjusted as shown in Table D

TABLE D

| PERIOD | PASS 1 | | PASS 2 | | PASS 3 | | TOTAL | |
|---|---|---|---|---|---|---|---|---|
| | ATT. | COM. | ATT. | COM. | ATT. | COM. | ATT. | COM. |
| LIST | 2000 | | 1603 | | 1285 | | | |
| 1 | 202 | 29 | 162 | 24 | 130 | 19 | 493 | 72 |
| 2 | 2 | 0 | 2 | 0 | 2 | 0 | 6 | 0 |
| 3 | 447 | 81 | 359 | 65 | 287 | 52 | 1093 | 197 |
| 4 | 980 | 240 | 786 | 192 | 630 | 154 | 2396 | 587 |
| 5 | 182 | 30 | 146 | 24 | 117 | 19 | 446 | 73 |
| 6 | 92 | 10 | 74 | 8 | 59 | 7 | 224 | 25 |
| 7 | 7 | 0 | 6 | 0 | 5 | 0 | 18 | 0 |
| 8 | 74 | 5 | 60 | 4 | 48 | 3 | 181 | 13 |
| 9 | 4 | 1 | 3 | 0 | 2 | 0 | 9 | 1 |
| 10 | 9 | 0 | 7 | 0 | 6 | 0 | 22 | 1 |
| | 2000 | 397 | 1603 | 318 | 1285 | 255 | 4889 | 970 |

Turning now to the system 10 in general, upon initializing the system 10, the analyst may enter an initial estimated call completion percentage for each sub-period of each outbound call campaign. The initial estimated call completion percentage may be based upon one or more group types to which the call campaign is directed or simply an overall estimate that will be corrected by subsequently collected statistics.

The analyst may also provide or identify a list 30 of telephone numbers or other identifiers for each outbound call campaign and a number of passes for each campaign. The list 30 may simply be a list of telephone numbers or URLs and names of call targets purchased from an outside source or may be a list of existing clients of the organization.

The analyst may also enter one or more values of $\mu$. A different value for $\mu$ may be provided for each campaign based upon other factors (e.g., the relative importance of the call campaign, call center loading, number of available agents, etc.).

Upon completion of the entry of initial values, the terminal 24 of the analyst may transfer the list(s) 30 through the host 32 to a telephone dialer 26 within the ACD 34. The terminal 24 may also transfer the initial estimated completion percentages, the number of passes, the values of $\mu$ and identifiers of the lists 30 to a scaling processor 28 either within the ACD 34 or host 32.

In response, the scaling processor 28 may calculate an exponential scaling ratio or factor for each sub-period. In this case, the exponential scaling ratio is the fraction of the respective list 30 that will be dialed during any one pass and sub-period.

The calculated exponential scheduling ratio is transferred to a scheduling processor 27. Within the scheduling processor 27, the ratio is multiplied by the appropriate list to determine the appropriate number of calls to schedule for each sub-period and the number of agents that must be scheduled to work during those sub-periods. At the appropriate time, the scheduled number of calls for each sub-period is then transferred to the dialer 26.

Upon receipt of the number of calls for each sub-period, the dialer 26 may begin placing calls through the PSTN 44 or Internet 46 to clients 36, 38. As each call is placed, the dialer 26 sends an outgoing call notification to a statistics processor 28 along with an identifier of the call. Upon placing the call, the dialer 26 may continue to monitor the call connection or pass the monitoring function off to another monitoring device.

In either case, the monitoring device monitors the call connection for completion of the call. If a person answers the call, the monitoring device passes the call off to an assignment processor and sends a call complete message to the statistics processor 28 along with the identifier of the call.

The assignment processor receives the call and selects an agent 40, 42 to handle the call. Agent selection may be based upon any criteria (e.g., longest available, most skilled, etc.).

Once an agent has been selected, the assignment processor may send an instruction to the ACD 34 to connect the call with the client 36, 38 to a telephone 48, 50 of the selected agent 40, 42. The assignment processor may also send a call set up message to the host 32 identifying the call and the agent 40, 42 to which the call was assigned.

In response, the host 32 may identify the call as being part of a outbound call campaign via the call identifier transferred to the host 32 within the call set up message. Upon identifying the call campaign associated with the call, the host 32 may retrieve an identifier of a call target associated with the telephone number and customer records (if any) associated with the call target. The host 32 may transfer the identifier of the call target to a terminal 52, 54 of the selected agent 40, 42 for display on the terminal 52, 54 as a screen pop at the same instant that the call is delivered to the selected agent 40, 42.

The agent 40, 42 may receive the call and begin conversing with the person answering the call. As a first step, the selected agent 40, 42 may inquire if he/she is speaking to the call target. If not, then the agent 40, 42 may apologize and hang up. At the same time, the agent 40, 42 may activate a softkey on his/her terminal indicating the reason for terminating the call. In this case, the selected agent 40, 42 may activate a WRONG PARTY softkey to indicate that the right party was not contacted. In response, the terminal 52, 54 may send a termination message to the statistics processor 28 along with the call identifier indicating that the right party was not contacted.

In response to the messages, the statistics processor 28 processes and determines completion percentages for each group type. The statistics determined include a completion percentage based upon the number of outbound calls answered by group type and the percentage of right party connections.

In order to further ameliorate short term effects, the analyst working through the analyst terminal 24 may have the ability to average a current set of call completion ratios with historical values (e.g., call completion percent, right party completion percent, dollars per call, etc.). In this regard, the analyst may provide some percentage value 20-80% to weight the current call completion ratio against the historical values. For example, if the analyst were to give a set of current completion ratios a 20% weighting then the statistics processor may multiply current completion ratios by 20% and the historical values by 80% and add the results to provide an overall weighted completion ratio.

It should be noted that the statistics processor 28 may provide a set of statistics in any of a number of different formats. Under one format, the statistics processor 28 may collect call completion statistics where each day of the week defines a calling period and in which sub-periods may be defined in hours of portions of an hour.

Statistics may also be defined based upon the time of the year. For example, a merchant may want to provide a set of calling periods for the week before Christmas and a different set for the week after Christmas. The definition of call completion statistics may be defined in terms of anyone answering the call and the right party answering the call.

It should be noted that any particular call campaign may include one or more group types. Moreover, call campaigns may be developed based upon the commercial advantages associated with any particular group type. As such, call completion percentages and right party connection percentages may be determined for any new campaign based upon a prior history with the same group type(s).

It should also be noted that the method described above for scheduling outbound calls may be used in any of a number of different calling environments, including both blended and unblended. For example, outbound calling campaigns that have a predetermined profile of call completion percentages over a sequence of sub-periods may be combined with other call types with complementary call completion profiles. For example, an outgoing call campaign to young mothers may be targeted to a time period between 8 and 9 am. The time period of from 8 to 9 am may be a period when a minimum of incoming calls are received and would allow a large number of agents that would otherwise be idle to be concentrated on the outgoing call campaign.

Alternatively, a first outgoing call campaign may be combined with a second outgoing call campaign with a complementary completion profile. For example, the first call campaign may be targeted to work-at-home adults that are mostly at home between 10 am and 2 pm during the day while the second campaign may be targeted to work-away-from-home adults who are only at home in the early to late morning or in the early evening.

A specific embodiment of method and apparatus for scheduling outbound calls has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of scheduling calls comprising:
   providing a calling period divided into a plurality of sub-periods, each sub-period for permitting making a plurality of calls;
   determining a historical group call completion ratio associated with each of the plurality of sub-periods based upon prior call history for a group of a plurality of call targets of a selected type;
   exponentially scaling each respective determined call completion ratio using a selected adjustable exponent which is adjusted to match an outgoing call volume with agent availability in real time;
   placing a plural number of calls during each respective sub-period of the calling period where the number of calls placed during at least some of the sub-periods is determined based upon the respective exponentially scaled call completion ratio; and
   normalizing a sum of the exponentially scaled call completion ratios to a value of 1.0 to generate a normalized completion ratio for each respective sub-period and multiplying a total number of planned calls by the normalized completion ratio for each respective sub-period to obtain a respective number of calls to be made for each respective call sub-period.

2. The method as in claim 1 further comprising determining a list size for outbound calls to be completed during the calling period and determining how many calls to make during each respective sub-period based on the respective exponentially scaled call completion ratio and the list size.

3. The method as in claim 2 further comprising determining a number of passes to complete the determined list during the calling period and utilizing the number of passes to determine how many calls to make during each respective sub-period.

4. The method as in claim 1 wherein the determined set of historical call completion ratios further comprise calls answered.

5. The method as in claim 4 wherein the determined set of historical call completion ratios further comprise calls answered by the correct party.

6. The method as in claim 1 wherein the determined call completion ratios further comprise a combination of current call completion ratios and historical call completion ratios.

7. The method as in claim 1 wherein the determined call completion ratios further comprise collecting call completion ratios collected for a plurality of different call types.

8. An apparatus for scheduling calls wherein a calling period corresponding to a work shift period is divided into a plurality of sub-periods for making a plurality of calls, comprising:
   means for determining a respective historical group call completion ratio, for a group of a plurality of call targets, associated with each respective sub-period of the plurality of sub-periods;
   means for exponentially scaling each respective determined call completion ratio by a selected adjustable exponent adjusted to match an outgoing call volume to agent availability in real-time;
   means for placing a plural number of calls during each respective sub-period of the calling period where the number of calls placed during at least some of the sub-periods is determined based upon the respective exponentially scaled call completion ratio; and
   means for normalizing a sum of the exponentially scaled call completion ratios to a value of 1.0 to generate a normalized completion ratio for each respective sub-period and multiplying a total number of planned calls by the normalized completion ratio for each respective sub-period to obtain a respective number of calls to be made for each respective call sub-period.

9. The apparatus as in claim 8 further comprising means for determining a list size for outbound calls to be completed during the calling period, and means for determining how many calls to make during each respective sub-period based upon the respective exponentially scaled call competition ratio, and the list.

10. The apparatus as in claim 9 further comprising means for determining a number of passes to complete the determined list during the calling period and means for utilizing the number of passes to determine how many calls to make during each respective sub-period.

11. The apparatus as in claim 8 wherein the determined set of historical call completion ratios further comprise calls answered.

12. The apparatus as in claim 11 wherein the determined set of historical call completion ratios further comprise calls answered by the correct party.

13. The apparatus as in claim 8 wherein each of the determined call completion ratios further comprise a combination of current call completion ratios and historical call completion ratios.

14. The apparatus as in claim 8 wherein the determined call completion ratios further comprise collecting call completion ratios collected for a plurality of different call types.

15. An apparatus for scheduling calls comprising:
   a processor that determines a respective historical group call completion ratio, for a plurality of call targets, associated with each respective sub-period of a plurality of sub-periods of a work shift period, the sub-period for making a plurality of calls;
   a scaling processor that exponentially scales each respective determined call completion ratio utilizing a selected adjustable exponent adjustable to match an outgoing call volume with an agent availability in real time, and that normalizes a sum of the exponentially scaled call completion ratios to a value of 1.0 to generate a normalized completion ratio for each respective sub-period and multiplies a total number of planned calls by the normalized completion ratio for each respective sub-period to obtain a respective number of calls to be made for each respective call sub-period; and
   a dialer that places a plural number of calls during each respective sub-period of the calling period where the number of calls placed during at least some of the sub-periods is determined based upon the respective exponentially scaled call completion ratio.

16. The apparatus as in claim 15 further comprising a list of outbound calls to be completed during the calling period and wherein the list and the respective exponentially scaled call completion ratio is used to determine how many calls are to be dialed by the dialer during each respective sub-period.

17. The apparatus as in claim 15 wherein the determined set of historical call completion ratios further comprise calls answered.

18. The apparatus as in claim 17 wherein the determined set of historical call completion ratios further comprise calls answered by the correct party.

19. The apparatus as in claim 15 wherein the determined call completion ratios further comprise an average of current call completion ratios and historical call completion ratios.

20. The apparatus as in claim 15 wherein the determined call completion ratios further comprise collecting call completion ratios collected for a plurality of different call types.

* * * * *